INVENTORS
Samuel G. Eskin,
Adele M. Arketyan
and Harold W. Rice.
BY
THEIR ATTORNEY Aug. 19, 1952　　　S. G. ESKIN ET AL　　　2,607,530
COMBINED THERMOSTAT AND AUTOMATIC PILOT CONTROL
Filed June 17, 1950　　　3 Sheets-Sheet 2

INVENTORS
Samuel G. Eskin,
Adele M. Arkelyan
and Harold W. Rice.
BY
Albert J. Henderson
THEIR ATTORNEY Aug. 19, 1952  S. G. ESKIN ET AL  2,607,530
COMBINED THERMOSTAT AND AUTOMATIC PILOT CONTROL
Filed June 17, 1950  3 Sheets-Sheet 3

INVENTORS
Samuel G. Eskin,
Adele M. Arkelyan
and Harold W. Rice
BY
Albert J. Henderson
THEIR ATTORNEY Patented Aug. 19, 1952

2,607,530

UNITED STATES PATENT OFFICE 2,607,530

COMBINED THERMOSTAT AND AUTOMATIC PILOT CONTROL

Samuel G. Eskin, Harold W. Rice, and Adele M. Arkelyan, Los Angeles, Calif., assignors to Robertshaw-Fulton Controls Company, Greensburg, Pa., a corporation of Delaware Application June 17, 1950, Serial No. 168,791

7 Claims. (Cl. 236—21)

1

This invention relates to combination controls for gaseous fuel burners wherein the temperature controlling device and the pilot cut-off both operate upon a single control valve.

The present invention is particularly adapted, although not limited, for use with gas burning water heaters and the like wherein water temperatures are controlled within precise limits. The thermostatic device which is responsive to the water temperature is preferably of the rod-and-tube type having temperature adjustment means located on the control body for ready access by the user. The automatic pilot control in this embodiment includes an expansible thermal element of the mercury vapor-pressure type responsive to the flame of the pilot burner.

Since provision may be made for complete shut-off of fuel to both the main and pilot burners under automatic control a separate pilot valve can be provided for conjoint operation to closed position with the main burner valve. Operation of such a pilot valve to open position can conveniently be effected by a control handle on the body adjacent the temperature adjustment means. An interlock between the main gas cock and the pilot valve will permit operation of the latter to open position only when the gas cock is in the "Pilot" position and is thus positioned for preventing flow of fuel to the main burner valve. Thereafter, the pilot valve is maintained open by operation of the automatic pilot control whenever the pilot burner is producing a flame for heating the expansible thermal element.

The invention includes a novel lever system operative between the main burner valve and the thermostat and automatic pilot control and also between the pilot valve, where provided, and the control handle for correlating the action of these parts to provide complete safety in starting and under normal running conditions. The levers are removed from the path of gas flow and are not subject to corrosive influences. Moreover, a fail-safe type of unit is provided to prevent leakage of gas under abnormal conditions.

With these and other objects and advantages in view a preferred embodiment of the invention is illustrated in the accompanying drawings wherein:

Fig. 4 is a partial cross-section taken on the

Figure 1:
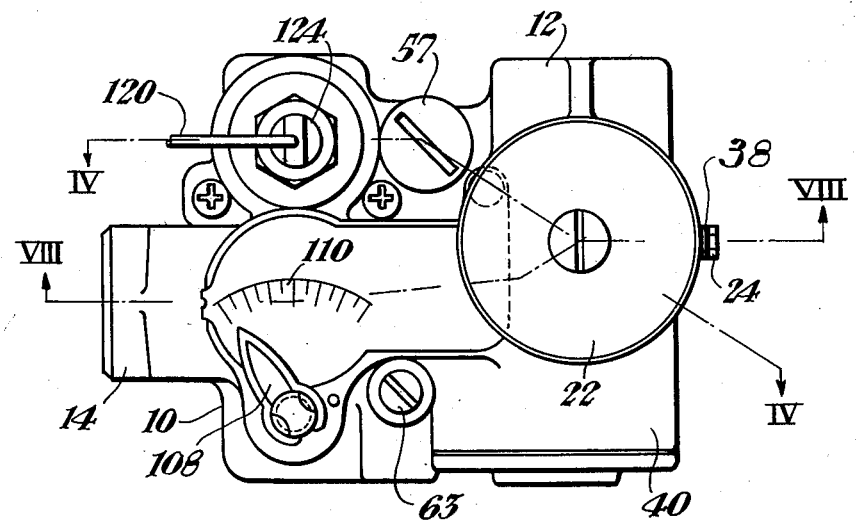
Fig. 1 is a plan view of the control device.
Figure 2:
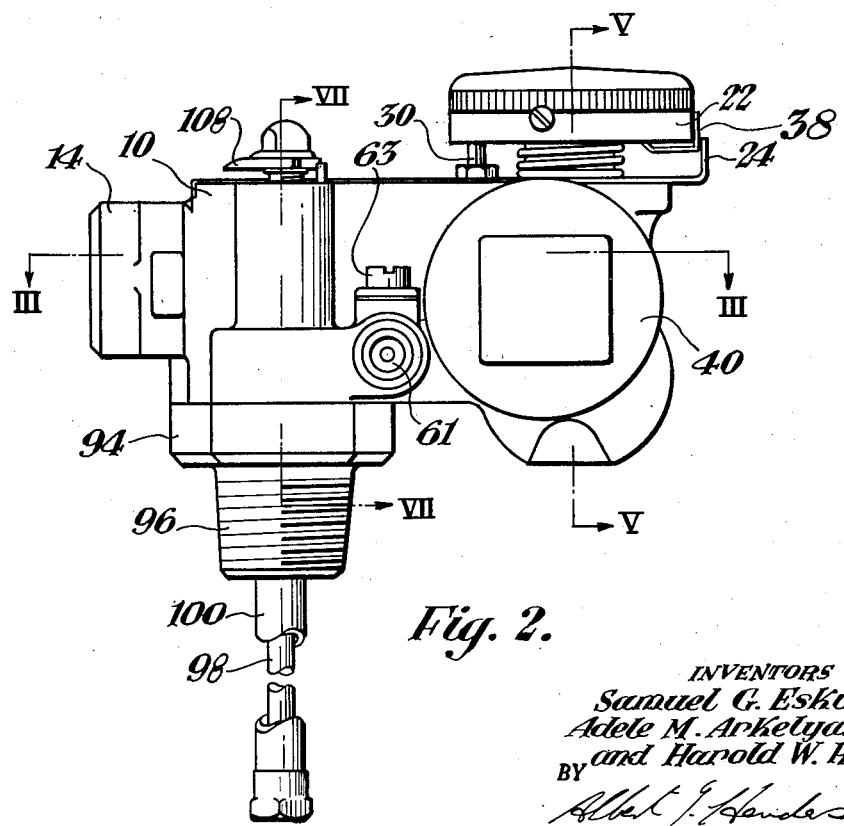
Fig. 2 is a front elevation of the control device shown in Fig. 1.
Figure 6:
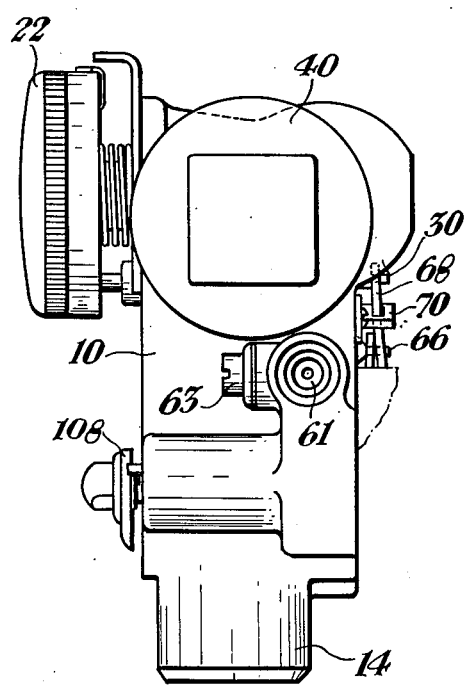
Figure 5:
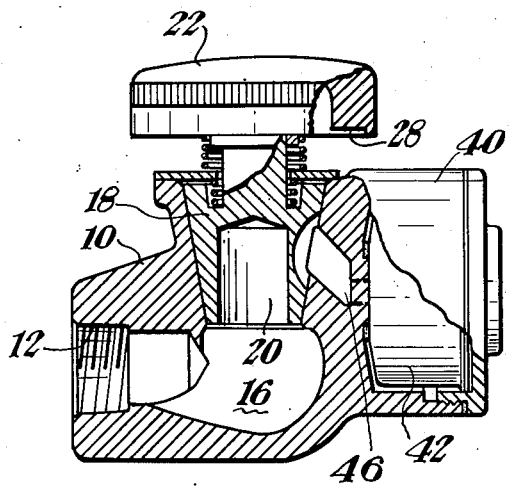
Figure 7:
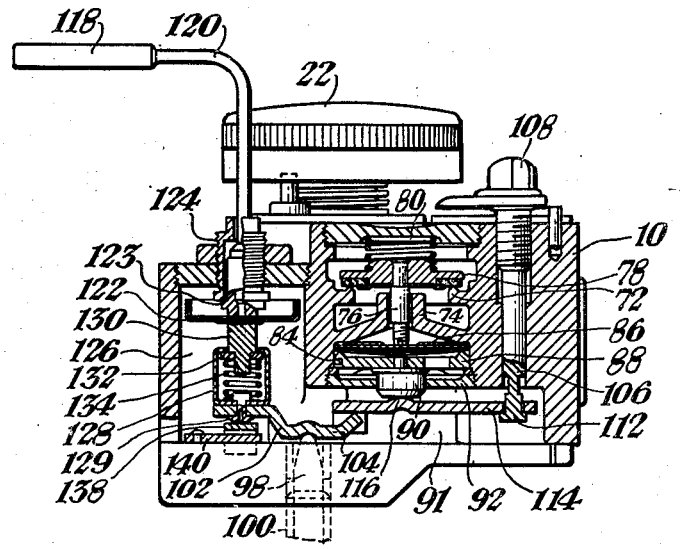
Figure 8:
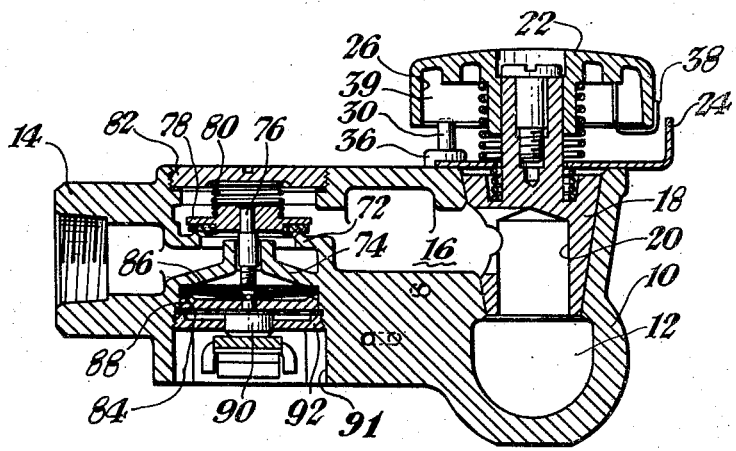

2 line IV—IV of Fig. 1 but revolved ninety degrees,

Fig. 5 is a section taken on the line V—V of Fig. 2,

Fig. 6 is a partial front elevation of the control shown in Fig. 1 but revolved 90°, Fig. 7 is a section taken on the line VII—VII of Fig. 2, and Fig. 8 is a partial cross-section taken on the line VIII—VIII of Fig. 1.

Main shut-off cock

Referring more praticularly to the drawings, the control device comprises a casing 10 provided at one end with a lateral inlet opening 12 for fuel and at the other end with an outlet opening 14 for the fuel. A main fuel passage 16 through the casing 10 provides communication between the inlet 12 and the outlet 14. As is customary in such devices suitable pipe connections may be provided at the inlet 12 and the outlet 14 to convey fuel through the passage 16 to a main burner (not shown) of the appliance upon which the control is to be used.

The passage of fuel between the inlet 12 and the outlet 14 is under control of a main shut-off cock 18. The cock 18 is provided with an angular port 20 which is movable upon manual rotation of the cock 18 by a knob 22 to open and close communication through the passage 16 between the inlet 12 and the outlet 14. Preferably, the knob 22 carries the usual indicia (not shown) for the "ON" "OFF" and "Pilot" positions of the main shut-off cock 18 which are adapted to register selectively with a pointer 24 secured to the casing 10 in an appropriate location.

The knob 22 is also adapted for axial movement relative to the cock 18 and is provided on its under side with a substantially annular recess 26 which, however, is interrupted by an unrecessed or land portion 28, Fig. 5, which lies opposite the indicia "Pilot." A plunger 30 projects through the casing 10 substantially parallel with the axis of the main shut-off cock 18 and is adapted to be engaged by the land portion 28 upon axial movement of the knob 22 when in the "Pilot" position. The plunger 30 is biased by a coil spring 32 outwardly of the casing 10 but such movement is limited by engagement of a collar 34 formed on the plunger 30 with the interior bottom wall of a cap nut 36 on the casing 10 and through which the plunger 30 projects. Rotation of the cock 18 is limited to an arc of approximately 180° between the "OFF" and "ON" positions by an adjustable stop element 38 which projects from the knob 22 for engagement with one side of the plunger 30 and by an abutment 39 on the underside of the knob 22 for engagement with the opposite side of the plunger 30.

Pilot valve

Figure 4:
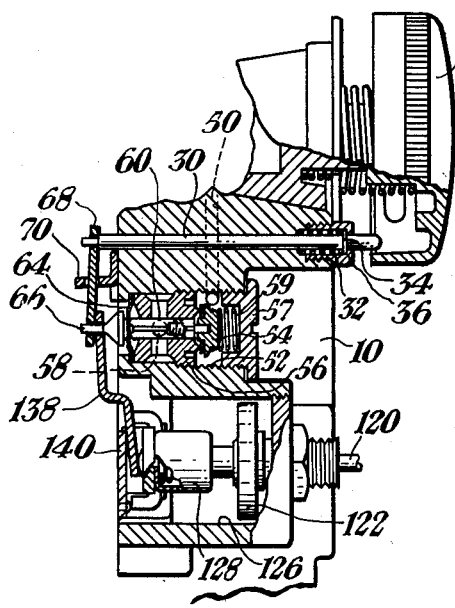
Figure 3:
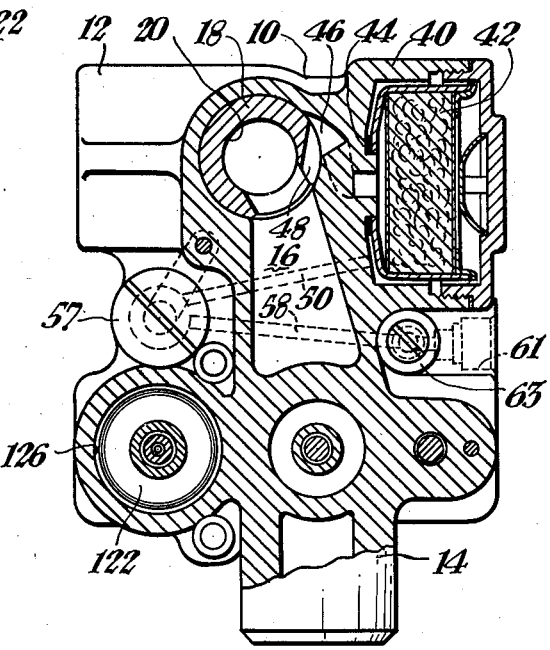
Fig. 3 is a cross-section taken on the line III—III of Fig. 2 but revolved ninety degrees.

As shown more clearly in Figs. 3–5 the casing 10 is provided with an integral hollow boss 40 disposed on one side of the shut-off cock 18 and provided with a filter cartridge 42 for the pilot fuel. The bottom wall of the filter cartridge 42 is suitably sealed, as at 44, in fluid-tight connection with the bottom wall of the hollow boss 40. The outer wall of the cartridge 42 is, however, spaced from the inner wall of the boss 40 to provide for passage of fuel therebetween. To this end, a passage 46 is formed in the casing 10 for communication at one end with an arcuate groove 48 in the side wall of the shut-off cock 18 forming an extension of the port 20 therethrough. The groove 48 affords communication between the port 20 and the passage 46 when the shut-off cock is in the "ON" position and fuel is passing directly from the port 20 to the main fuel passage 16.

The opposite end of the passage 46 communicates with the hollow boss 40 adjacent the center of the filter cartridge 42 which thereby receives fuel to be filtered and emitted at the opposite end thereof. A pilot passage 50 communicates at one end with the space between the outer wall of the filter cartridge 42 and the inner wall of the hollow boss 40 and thereby forms an inlet passage to a pilot valve chamber 52 formed in the casing 10 to one side of the main fuel cock 18. A pilot valve member 54 is mounted in the chamber 52 and is reciprocable on an axis substantially parallel with that of the plunger 30 to open and close a passage through a valve seat member 56 which is supported in the chamber 52. A closure cap 57 provides access to the valve member 54 and also forms a seat for one end of a coil spring 59 serving to bias the valve member 54 toward its seat 56. An outlet passage 58 communicates with the passage in the valve seat member 56 and thus receives a supply of fuel from the inlet passage 50 when the valve member 54 is in open position. The opposite or outlet end of the passage 58 terminates in a suitable connection 61 for a pilot conduit for supplying fuel to a pilot burner (not shown). The usual adjusting means 63 is provided in the passage 58 for flow of fuel to the pilot burner.

Movement of the pilot valve member 54 between open and closed positions is effected by operation of a valve stem 60 which projects through the passage in the valve seat member 56 and is suitably fluted or noncircular to permit passage of fuel thereby. The usual sealing diaphragm 64 is provided for the operating end of the valve stem 60 to prevent leakage of fuel from the chamber 52. An operating head 66 is carried on the valve stem 60 on the opposite side of the sealing diaphragm 64 therefrom to provide convenient means for moving the valve member 54 to open position when desired. Such movement is accomplished by a pilot valve lever 68 which extends from the plunger 30 to the operating head 66 and is suitably pivoted intermediate its ends in a bracket 70 carried on the casing 10.

Control valve mechanism

As shown more clearly in Figs. 7 and 8, an annular valve seat member 72 is formed in the casing 10 in position to intersect the passage of fuel from the inlet 12 to the outlet 14 through the main fuel passage 16. An axial hollow boss 74 is formed within the annular valve seat 72 and provides a bearing for a valve stem 76 which is reciprocable therein. A disc valve member 78 is mounted on the valve stem 76 for axial reciprocable movement therewith between open and closed positions relative to the valve seat 72. The valve member 78 is normally biased toward the valve seat 72 by a coil spring 80 which is operative between a closure cap 82 secured to the casing 10 and the valve member 78.

The axial hollow boss 74 forms one wall of a chamber 84 in the casing 10 which houses a snap-action means of conventional form comprising clicker mechanism 86 and an annular thrust element 88 for operating the valve member 78 to open position against the bias of the coil spring 80. The thrust element 88 carries a thrust button 90 which projects through a sealing ring 92 forming an opposite wall for the chamber 84 and into a recess 91 formed in the casing 10. It will be observed that no fuel can flow from any of the various flow passages into the recess 91 due to the sealing arrangement.

Temperature regulation

Thermally responsive means for operating the valve member 78 through the clicker disc mechanism 86—90 is carried by a thermostat housing 94 which is secured to the exterior of the casing 10 across the recess 91. The housing 94 is provided with a threaded boss 96 through which the usual rod-and-tube element 98, 100 projects into the storage tank of a water heater or the like (not shown). As is customary in such devices, the rod 98 has a relatively low coefficient of expansion while the tube 100 has a higher coefficient of expansion and the differential under the influence of the heat of the water in the tank causes the rod 98 to move outwardly of the casing 10. As shown more clearly in Fig. 7, the rod element 98 projects into the recess 91 on one side of the thrust button 90 and is axially movable in a path substantially parallel with that of the valve member 78.

Means are employed for transmitting motion between the rod element 98 and the thrust button 90 and take the form of a first lever 102 which is supported intermediate its ends in the recess 91 on the rod 98. A free end 104 of the lever 102 is adapted for pivotal movement relative to the thrust button 90 upon movement of the rod 98 relatively to the casing 10 upon variations in the water temperature. Adjustable means are provided for setting the temperature to be maintained by the rod-and-tube element 98, 100 and take the form of an adjusting screw 106 which extends through the casing 10 on an axis substantially parallel with that of the valve member 78. One end of the adjusting screw 106 projects exteriorly of the casing 10 and is provided with a pointer 108 cooperable with a suitable scale 110 marked on the casing 10. The opposite end of the adjusting screw 106 projects into the recess 91 and is provided with an enlarged head 112. A second lever 114 is mounted at one end for pivotal movement on the head 112 and is supported at its opposite end by the first lever 102. Longitudinal alignment of levers 102 and 114 is maintained by a pair of projections 113 which depend from the lever 114 for engagement with opposite sides of the end 104 of the lever 102. A raised portion 116 is provided on the second lever 114 intermediate its ends for operative engagement with the thrust button 90 in response to counterclockwise pivotal movement of the first lever 102 as will be hereinafter apparent.

Automatic pilot control

The vapor-pressure type automatic pilot control of this invention is adapted to render the rod-and-tube element 98, 100 ineffective for overcoming the bias of the valve member 78 unless the pilot burner of the appliance is producing a flame. The automatic pilot control comprises an actuating device including a bulb element 118, a capillary tube 120 and a diaphragm unit 122 as is customary in such devices. The diaphragm unit 122 is connected to the capillary tube by a collar 123 which extends through a threaded bushing 124 carried by the casing 10 for adjustment purposes. The diaphragm unit 122 projects into a chamber 126 formed in the casing 10 which communicates at one end with the recess 91 but has no communication with any of the various flow passages.

The bulb element 118 contains a quantity of mercury which becomes vaporized upon the bulb element being sufficiently heated and serves to actuate the diaphragm unit 122 by expansion thereof. The expansion of the diaphragm unit 122 is transmitted to the first lever 102 through an override arrangement including a cage 128 secured by a riveted head 129 or the like at one end to the lever 102 and having slidable connection at the opposite end with a stud 130 projecting from the diaphragm unit 122. A loose collar 132 is mounted on the stud 130 within the cage 128 and a coil spring 134 is operative between the collar 132 and the opposite end of the cage 128. When the rivet 129 bottoms on means to be described the override arrangement provides a substantially unyielding device should the force exerted by the diaphragm unit 122 be less than the force of the spring 134. However, if the force of the spring 134 is exceeded, then the collar 132 is forced inwardly of the cage 128 by the expansion of the diaphragm unit 122 and a yieldable mounting is provided.

The rivet 129 engages with one end of a third lever 138, the opposite end of which extends into engagement with the operating head 66 of the pilot valve 54. The third lever 138 is pivoted intermediate its ends on a plate 140 which is secured to the housing 94 within the recess 91 in the casing 10. The plate 140 acts as a limiting stop for the override arrangement during free expansive movement of the diaphragm unit 122 by engaging the lever 138 and also serves as a fulcrum for this lever as will be described. It will be apparent that the relationship of the diaphragm unit 122 with the various levers is adjustable by means of the threaded bushing 124 which abuts diaphragm unit 122 for this purpose. It will also be apparent that when the rivet 129 engages the end of the lever 138 and moves the end of the lever 102 into engagement with the plate 140, the end of the lever 102 thus moved will be accurately located in a specific relation to the thrust button 90.

Operation

The control device is placed in operative condition by manual operation when the knob 22 is rotated to the "Pilot" position and pushed in axially to engage the plunger 30 with the land portion 28. The resulting movement of the plunger 30 causes the lever 68 to fulcrum about the bracket 70 in a counterclockwise direction as viewed in Fig. 4. The operating head 66, the pilot valve stem 60 and the pilot valve member 54 consequently move to the right to unseat the pilot valve member 54 and the lever 138 is rotated in a clockwise direction about the edge of the stop plate 140 as a fulcrum. Fuel now flows from the inlet 12, angular port 20 in the main shut-off cock 18, passage 46, filter cartridge 42, hollow boss 40, passage 50, pilot valve seat 56, and through passage 58 to the connection 61 for the pilot burner. It should be observed that in the "Pilot" position of the main fuel cock 18 that the angular port 20 does not place the inlet 12 in communication with the chamber 16, but merely in communication with the pilot passage 46.

The fuel flowing from the pilot burner is then ignited manually while the knob 22 remains depressed. The pilot flame heats the bulb 118 which is located adjacent to the pilot burner and forces the diaphragm unit 122 to expand. The override arrangement comprising cage 128, collar 132 and coil spring 134 is moved axially toward the stop plate 140 carrying the lever 102 toward the lever 138 until the latter is held securely against the stop plate 140 so that the free end of the lever 138 holds the valve member 54 in open position. The knob 22 may then be released and further rotated toward the "ON" position. Should the diaphragm unit 122 expand beyond the point at which the lever 138 seats against the stop plate 140 then the additional movement is taken up by the override arrangement becoming a yieldable device as previously described.

It may be assumed that the rod element 98 of the rod-and-tube thermal device 98, 100 is in an advanced position within the recess 91 as the water in the tank is still cold and the tube element 100 is contracted. Consequently, with the lever 102 held against the stop plate 140 by operation of the diaphragm 122, then the free end 104 will rotate in a counterclockwise direction about the rod element 98 as a fulcrum. Such movement of the lever 102 will be transmitted to the lever 114 which will fulcrum about the adjusting screw head 112 and rotate in a clockwise direction. The thrust button 90 is moved axially by the raised portion 116 of the lever 114 and causes the clicker mechanism 86—88 to snap over and actuate the valve member 78 to open position. The device is thus in normal running condition depending on the temperature set by the pointer 108 on the scale 110.

As the water in the tank increases in temperature, the rod element 98 will be retracted away from the casing 10 and the force exerted by the lever 114 on the thrust button 90 will cease. Thus, the valve 78 will move toward closed position relative to the valve seat 72 to shut-off flow of fuel through the outlet 14 to the main burner. Such operation of the valve member 78 between open and closed positions will continue to maintain the temperature set by the pointer 108. Since the normal operating position of the end of the lever 102 which cooperates with the override unit is always the same due to the positioning feature of the stop plate 140, it will be apparent that the temperature at which the thrust button is actuated by the lever 114 will depend solely upon the location of the fulcrum of the lever 114 (adjusting screw head 112). Thus the water temperature at which the valve member will be moved will depend solely upon the setting of the adjusting screw 106.

Should the flame at the pilot burner become extinguished then the bulb element 118 will become cooled allowing the diaphragm unit 122 to contract. The axial movement of the override arrangement will retract the end of the lever 102 which is secured by the rivet 129. Such movement of the lever 102 is in a clockwise direction about the rod element 98 as a fulcrum and the free end 104 no longer exerts a force upon the lever 114. Consequently, the valve spring 80 is free to exert its bias and the valve member 78 moves to closed position to shut-off flow of fuel through the outlet 14.

Simultaneously with operation of the lever 102 as described, the lever 138 is also caused to follow the movement of the over-ride arrangement. Thus, as diaphragm 122 contracts, the pilot valve spring 59 is free to exert its bias for pivoting the lever 138 in a counterclockwise direction about the edge of the stop plate 140. Hence, the pilot valve member 54 moves to closed position to shut-off flow of fuel to the pilot outlet 61. It is apparent that flow of fuel to both the main outlet 14 and the pilot outlet 61 is completely cut-off upon cooling of the bulb element 118 and no escape of fuel can occur. It is further apparent that if a leak develops in the actuating element 118—122 that a similar complete shut-off of fuel will occur.

As previously indicated the recess 91 and the chamber 126 in which the various levers and actuating means are housed are both sealed off from the fuel passages. Consequently, these parts are not exposed to gum formation or corrosion tending to shorten the usual life or interfere with free operation.

It will be understood that many changes may be made in the details of construction and arrangement of parts without departing from the scope of this invention as defined in the appended claims.

We claim:

1. A combined temperature and flame failure control comprising in combination, an axially reciprocable valve means biased to a closed position, a first thermally responsive device including a diaphragm unit positioned for movement on an axis substantially parallel with said valve means, a second thermally responsive device including a movable rod element, said diaphragm unit being movable toward said rod element upon said first thermally responsive device being heated, a first lever mounted for bodily movement by said diaphragm unit and being operatively engageable by said rod element intermediate said diaphragm unit and said valve means for pivotal movement relative to said valve means upon said second thermally responsive device being heated, adjustable means for setting the temperature to be maintained by said second thermally responsive device, a second lever mounted for pivotal movement on said adjustable means and being operatively engageable with said first lever for overcoming the bias of said valve means in response to said pivotal movement of said first lever, and means cooperable with said diaphragm unit forming a relatively fixed pivot for said first lever to maintain said temperature setting.

2. A combined temperature and flame failure control as claimed in claim 1 wherein the free movement of said diaphragm unit is limited by a stop, and a lost motion connection between said diaphragm unit and said stop.

3. A combined temperature and automatic pivot control comprising in combination, a pair of axially reciprocable valve means biased to a closed position, manually operable means for opening one of said pair of valve means, a first thermally responsive device including a diaphragm unit positioned for movement on an axis substantially parallel with said pair of valve means, a second thermally responsive device including a rod element, lever means extending between said valve means and said diaphragm unit and being operatively engageable by said rod element intermediate said diaphragm unit and the other said valve means for pivotal movement relative to said other valve means, means responsive to movement of said lever and being effective in one thermal condition of said first thermally responsive device for overcoming the bias of said other valve means but being ineffective in another said condition thereof, and means operable by said diaphragm unit for maintaining said one valve means in open position while said first thermally responsive device remains in said one thermal condition.

4. A combined temperature and automatic pilot control as claimed in claim 3 wherein the free movement of said diaphragm unit is limited by a stop, and the last said means comprises a lever pivoted on said stop.

5. A combined temperature and automatic pilot control comprising in combination, a casing having an inlet and an outlet for fluid, a rotatable valve member controlling a passage for fluid between said inlet and outlet, a pilot valve means controlling a passage for fluid from said inlet under control of said rotatable valve member and being biased to a closed position, manually operable means for opening said pilot valve means, an axially reciprocable valve means also controlling the passage of fluid between said inlet and outlet and being biased to a closed position, said reciprocable valve means having an operating portion projecting therefrom, said casing having a chamber into which said operating portion projects and being sealed against leakage of fluid from said passage between said inlet and outlet, a first thermally responsive device including a diaphragm unit positioned in said chamber for movement on an axis substantially parallel with said reciprocable valve means, a second thermally responsive device including a movable rod element positioned in said chamber, a lever mounted on said diaphragm unit in said chamber and operatively engageable by said rod element intermediate said diaphragm unit and said reciprocable valve means for pivotal movement relative to said reciprocable valve means, means responsive to movement of said lever and being effective in one thermal condition of said first thermally responsive device for operatively engaging said operating means and overcoming the bias of said reciprocable valve means but being ineffective in another said condition thereof, and means operable by said diaphragm unit for maintaining said pilot valve means in open position while said first thermally responsive device remains in said one thermal condition.

6. A combined temperature and automatic pilot control comprising in combination, a casing having an inlet and an outlet for fluid, a rotatable valve member controlling a passage for fluid between said inlet and outlet, a pilot valve means controlling a passage for fluid from said inlet under control of said rotatable valve member and being biased to a closed position, manually operable means for opening said pilot valve means, an axially reciprocable valve means also controlling the passage of fluid between said inlet and outlet and being biased to a closed position, a first thermally responsive device including a diaphragm unit positioned for movement on an axis substantially parallel with said reciprocable valve means, a second thermally responsive device including a movable rod element, said diaphragm unit being movable toward said rod element upon said first thermally responsive device being heated, a first lever mounted for bodily movement by said diaphragm unit and being operatively engageable by said rod element intermediate said diaphragm unit and said reciprocable valve means for pivotal movement relative to said reciprocable valve means upon said second thermally responsive device being heated, adjustable means for setting the temperature to be maintained by said second thermally responsive device, a second lever mounted for pivotal movement on said adjustable means and being operatively engageable with said first lever for overcoming the bias of said reciprocable valve means in response to said pivotal movement of said first lever, and a third lever mounted for pivotal movement by said diaphragm unit for maintaining said pilot valve means in open position while said first thermally responsive device remains heated.

7. A combined temperature and automatic pilot control as claimed in claim 6 wherein the free movement of said diaphragm unit is limited by a stop upon which said third lever is pivoted, and a lost motion connection between said diaphragm unit and said stop.

SAMUEL G. ESKIN.
HAROLD W. RICE.
ADELE M. ARKELYAN.

REFERENCES CITED

The following references are of record in the file of this patent:

UNITED STATES PATENTS

| Number | Name | Date |
|---|---|---|
| 1,953,446 | Strong | Apr. 3, 1934 |
| 2,085,300 | Dillman | June 29, 1937 |
| 2,163,801 | Newell | June 27, 1939 |
| 2,303,128 | Koppel | Nov. 24, 1942 |
| 2,387,164 | McCarty | Oct. 16, 1945 |